(No Model.) 2 Sheets—Sheet 1.
S. SCOGNAMILLO & C. DOMINICI.
BICYCLE.
No. 527,728. Patented Oct. 16, 1894.
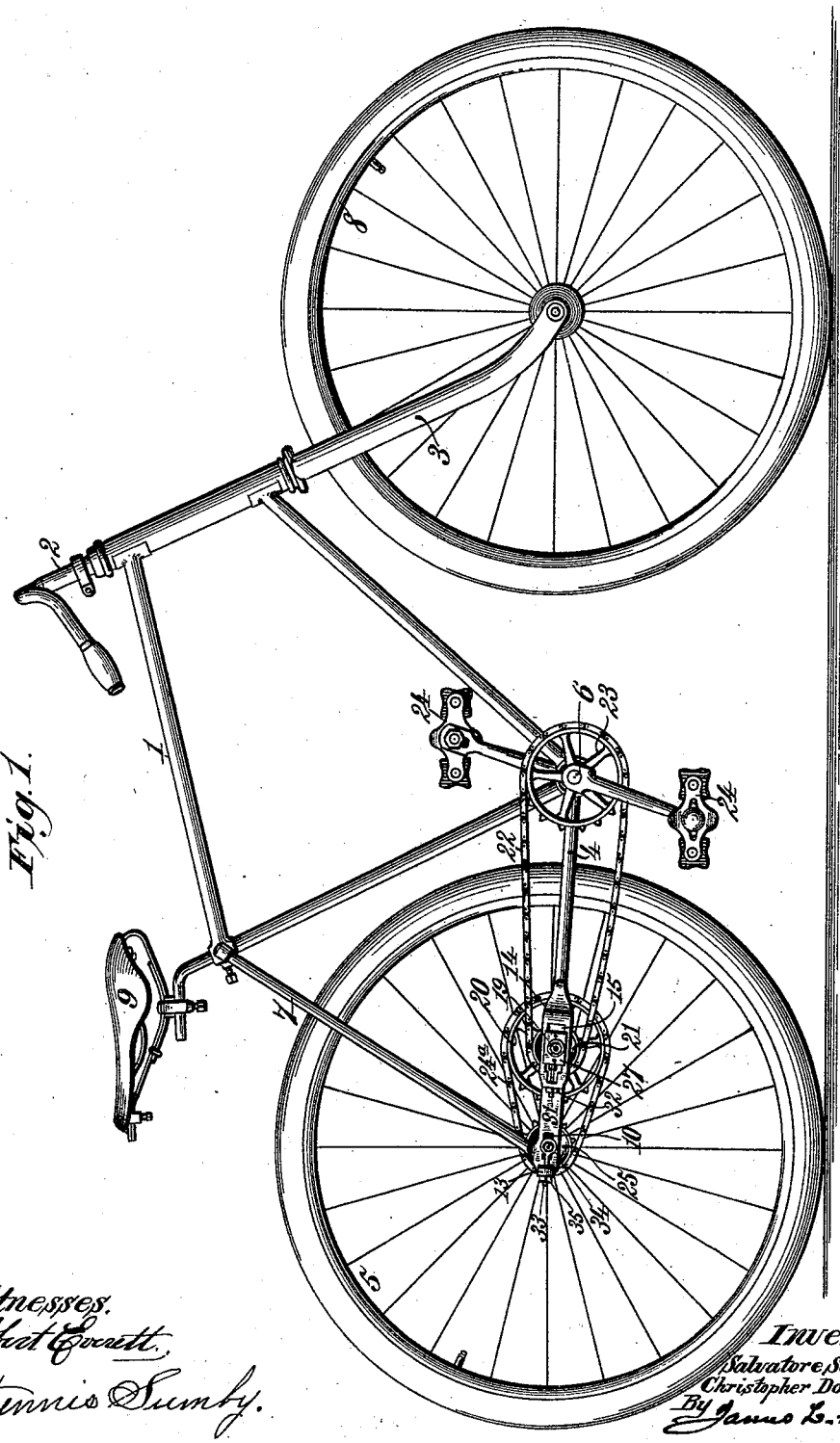

(No Model.) 2 Sheets—Sheet 2.
S. SCOGNAMILLO & C. DOMINICI.
BICYCLE.
No. 527,728. Patented Oct. 16, 1894.
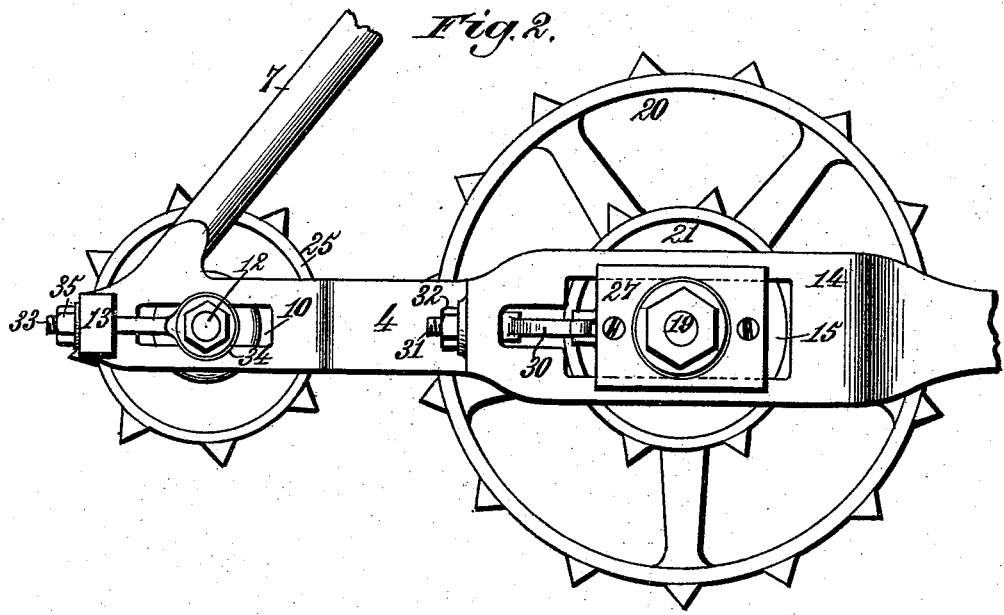
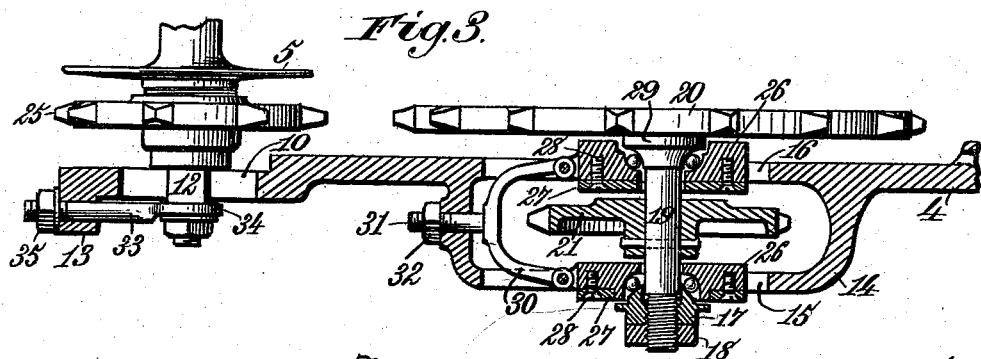
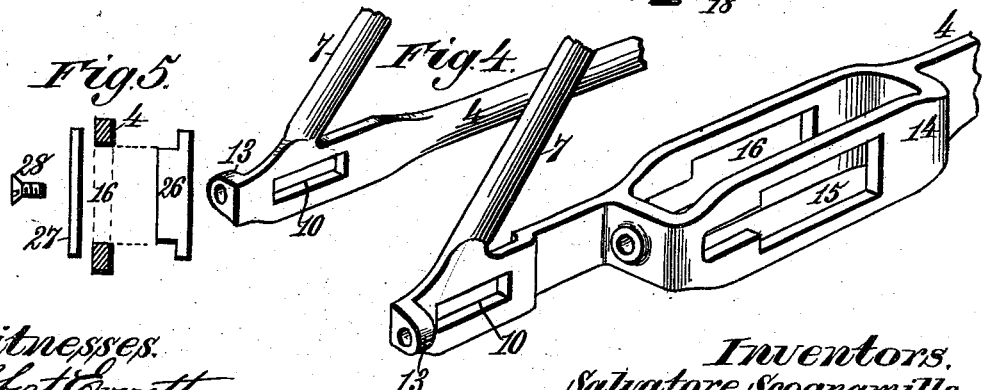
Witnesses.
Robert Everett
Dennis Sumby
Inventors.
Salvatore Scognamillo.
Christopher Dominici.
By James L. Norris.
Atty.

UNITED STATES PATENT OFFICE.

SALVATORE SCOGNAMILLO AND CHRISTOPHER DOMINICI, OF RICHMOND, VIRGINIA.

BICYCLE.

SPECIFICATION forming part of Letters Patent No. 527,728, dated October 16, 1894.

Application filed July 11, 1894. Serial No. 517,239. (No model.)

*To all whom it may concern:*

Be it known that we, SALVATORE SCOGNAMILLO and CHRISTOPHER DOMINICI, citizens of the United States, residing at Richmond, in the county of Henrico and State of Virginia, have invented new and useful Improvements in Bicycles, of which the following is a specification.

This invention relates to that type of bicycles wherein the pedal-shaft is connected by a chain with a countershaft having an independent chain connection with the axle of the rear drive-wheel for increasing the speed of the latter by a comparatively slow motion of the pedals.

The object of our invention is to improve the prior constructions by providing a novel ball bearing for the countershaft, and facilitating the adjustment of parts to govern the tension of the drive-chains by which accelerated motion is transmitted from the pedal-shaft to the rear drive-wheel.

To accomplish this object our invention consists in the features of construction and the combination or arrangement of parts hereinafter described and claimed, reference being made to the accompanying drawings, in which—

Figure 1 is a side elevation of a bicycle provided with our invention. Fig. 2 is a broken side elevation, showing the rear end portion of the yoke frame. Fig. 3 is a longitudinal sectional view of the same. Fig. 4 is a detail, broken perspective view, showing the rear end portion of the yoke-frame; and Fig. 5 is a detail sectional view to illustrate the manner of securing the pedal bearings in position.

In order to enable those skilled in the art to make and use our invention, we will now describe the same in detail, referring to the drawings, wherein—

The numeral 1 indicates the bicycle frame, which may be of any known or desired construction suitable for the purpose, but, as here shown, it is the usual diamond frame comprising a steering-post 2, a front fork 3, and a frame 4 of the usual yoke shape to embrace the rear drive-wheel 5. The frame 1 carries at its lower portion the pedal-shaft 6, and the yoke-frame 4 extends from the pedal-shaft to the rear inclined rod 7 and forms a rigid part of the frame. The fork 3 carries the usual front steering-wheel 8, and the frame is provided with a suitable saddle or seat 9.

The rear end portions of the yoke-frame 4 are provided with longitudinal slots 10 having closed ends, and in which the axle or shaft 12 of the rear drive-wheel 5 is movable back and forth. The rear extremities of the yoke-frame are formed integral with lateral abutments in the form of arms or lugs 13, and in proximity to the slot 10 of one of the arms or members of the yoke-frame 4, the latter is formed integral with a laterally projecting yoke 14 having a longitudinal slot 15 coincident with a longitudinal slot 16 in the yoke frame proper, Figs. 3 and 4. The slots 15 and 16 serve to receive ball bearings which are movable back and forth in said slots. The ball-bearings receive and support a countershaft 19 having at its inner end a rigidly attached chain-wheel 20, and between the ball-bearings the countershaft is provided with a rigidly attached chain-wheel 21 of considerably less diameter than the chain-wheel 20. The chain-wheel 21 is located within the yoke 14 and connects by a chain 22 with a chain-wheel 23 secured to the pedal-shaft 6, so that by revolving the pedals 24, motion is imparted to the countershaft, and the latter transmits motion to the rear drive-wheel by a chain 24ª engaging the chain-wheel 20 and a chain-wheel 25 on the axle of the rear drive-wheel, whereby an accelerated motion is imparted to the rear drive-wheel, and the speed of the bicycle is materially increased without a corresponding speed in the revolution of the pedals.

The ball-bearings are each composed of a flanged block, as at 26, Fig. 5, adapted to bear against one side of the yoke-frame 4, and to be confined in position by a plate or ring 27 bearing against the opposite side of the yoke-frame and connected with the flanged block 26 through the medium of screws 28.

The outer end of the countershaft 19 is provided with a threaded portion, with which engage nuts 17 and 18, the inner one of which bears against the balls of one of the ball-bearings, while the inner end of the counter-shaft is provided with a collar 29 which bears against the balls of the other ball-bearings.

The ball-bearings are provided with a yoke 30 having a central stem 31 extending through the rear end wall of the yoke 14, and provided with a screw-threaded portion to receive a nut 32 which bears against the yoke 14, in such manner that by turning the nut 32 in the proper direction, the ball-bearings will be simultaneously moved in the slots 15 and 16, for the purpose of tightening or loosening the chain 22, and thereby regulating its tension. The tension of the chain 24$^a$ is readily governed or regulated by a bar 33 having at its front end an eye 34, and at its rear end a screw-threaded portion extending through the lug 13, and provided with a nut 35 which bears against the lug, so that by turning the nut 35 in the proper direction, the axle of the rear drive-wheel can be moved in the slots 10 to regulate the tension of the chain 24$^a$.

It will be obvious that a bolt, such as 33, will be employed at the rear end of each arm or member of the yoke frame 4, but it is not deemed necessary to show both bolts, as they are the same in construction and operation, and therefore the illustration of one is deemed sufficient.

By constructing the rear extremities of the arms or members of the yoke-frame 4 with laterally projecting abutments in the form of arms or lugs 13, and arranging the bolts 33 in the manner shown, with the nuts 35 to bear against the rear extremities of the yoke-frame, the axle of the rear drive-wheel can be very conveniently and readily adjusted back and forth for the purpose of regulating the tension of the chain 24$^a$. The mere tightening of the nuts 35, by reason of their bearing against the arms or lugs 13, serves to shift the axle of the drive-wheel in a rearward direction, and this can be conveniently effected by the use of an ordinary wrench, which is susceptible of a free swinging movement, owing to the location of the arms or lugs 13 on the rear extremities of the yoke-frame.

The construction of the yoke-frame 4, with the slot 16 and with a laterally projecting yoke 14, having a slot 15, provides for the employment of two ball-bearings, so that the countershaft 19 is properly sustained at its outer and inner end portions, and all binding of the countershaft is effectually prevented, since both ball-bearings are simultaneously shifted through the medium of the yoke 30 and nut 32 engaging the stem 31.

The improved construction and arrangement provides very simple, efficient, and desirable means for governing or regulating the tension of the two drive-chains, and by the latter the desired accelerated motion is imparted to the rear drive-wheel by the revolution of the pedals, so that the speed of the bicycle is materially increased by a comparatively slow motion of the pedals.

Having thus described our invention, what we claim is—

1. The combination of a yoke-frame having front and rear longitudinal slots and formed integral with laterally projecting abutments and a laterally projecting slotted yoke, ball bearings adjustable back and forth in the front slot of the yoke-frame and the slot in the laterally projecting yoke, a counter shaft mounted in the ball bearings and provided with two chain wheels of different diameter, a drive-wheel having an axle adjustable back and forth in the yoke-frame, adjusting devices carried by the said laterally projecting abutments for adjusting said drive-wheel, a pedal-shaft mounted in fixed bearings and having a chain-wheel, a chain connecting the chain-wheel of the pedal-shaft with one of the chain-wheels on the counter-shaft, and a chain connecting the other chain-wheel of the countershaft with the axle of the rear drive-wheel, substantially as described.

2. The combination of a yoke-frame having front and rear longitudinal slots and formed integral at its rear extremities with laterally projecting abutments and with a laterally projecting slotted yoke at the said front slot, a pair of ball-bearings movable back and forth in the front slot of the yoke-frame and the slot in the laterally projecting yoke, a countershaft mounted in said ball-bearings and having two chain-wheels of different diameter, a yoke connected with the ball-bearings, devices for adjusting the yoke to simultaneously move the ball-bearings, a rear drive-wheel having an axle extending through the rear slots of the yoke-frame, bars having eyes engaging the drive-wheel axle and extending through the laterally projecting abutments, nuts mounted on the bars and bearing against the rear sides of said abutments, a pedal-shaft having a chain-wheel, a chain connecting the chain-wheel of the pedal-shaft with one of the chain-wheels of the countershaft, and a chain connecting the other chain wheel of the countershaft with a chain-wheel on the axle of the rear drive-wheel, substantially as described.

3. The combination of a yoke-frame 4 having slots 10 and 16, and a laterally projecting yoke 14 provided with a longitudinal slot 15, a pair of ball bearings movable back and forth in the slots 15 and 16, the yoke 30 connected with the ball-bearings and having a screw-threaded stem 31, a nut 32 engaging said stem, a rear drive-wheel having an axle extending through the slots 10, rods 33 having eyes 34 engaging the drive-wheel axle, nuts 35 engaging the said bars and bearing against the rear extremities of the yoke-frame, a countershaft mounted in the ball-bearings and provided with two chain-wheels of different diameter, a pedal-shaft having a chain-wheel, a chain connecting the chain-wheel of the pedal-shaft with one of the chain-wheels on the countershaft, and a chain connecting the other chain-wheel of the countershaft with a chain-wheel on the axle of the rear drive-wheel, substantially as described.

In testimony whereof we have hereunto set our hands and affixed our seals in presence of two subscribing witnesses.

SALVATORE SCOGNAMILLO. [L. S.]
CHRISTOPHER DOMINICI. [L. S.]

Witnesses:
V. HECHLER,
WM. W. GROSSWELT.